United States Patent [19]
von der Heide

[11] Patent Number: 4,882,511
[45] Date of Patent: Nov. 21, 1989

[54] BRUSHLESS THREE-PHASE D.C. MOTOR

[75] Inventor: Johann von der Heide, Schramberg, Fed. Rep. of Germany

[73] Assignee: Papst-Motoren GmbH & Co. KG, St. Georgen, Fed. Rep. of Germany

[21] Appl. No.: 733,223

[22] Filed: May 10, 1985

[30] Foreign Application Priority Data

Jun. 1, 1984 [CH] Switzerland .......................... 2680/84
Jan. 9, 1985 [CH] Switzerland ...................... 00078/85

[51] Int. Cl.$^4$ ...................... H02K 21/22; H02K 29/08
[52] U.S. Cl. ................................ 310/67 R; 310/68 R; 318/138
[58] Field of Search ...................... 310/12, 67 R, 68 R, 310/156, 177, 68 B; 318/138, 254 A

[56] References Cited

U.S. PATENT DOCUMENTS

| 4,151,447 | 4/1979 | von der Heide et al. | 310/12 |
| 4,283,664 | 8/1981 | Ebert | 318/254 A |
| 4,311,933 | 1/1982 | Riggs et al. | 310/67 R |
| 4,495,450 | 1/1985 | Tokizaki et al. | 318/138 |
| 4,554,473 | 11/1985 | Müller | 310/67 R |
| 4,574,211 | 3/1986 | Müller | 310/67 R |

FOREIGN PATENT DOCUMENTS 3122049 7/1982 Fed. Rep. of Germany .
3123441 7/1982 Fed. Rep. of Germany .

Primary Examiner—Patrick R. Salce
Assistant Examiner—D. L. Rebsch
Attorney, Agent, or Firm—Theodore J. Koss, Jr.

[57] ABSTRACT

Collectorless (brushless) three-phase DC motor having a permanent-magnet arrangement and a three-phase winding, these being movable relative to each other, and having three position sensors which are stationary relative to the winding and controlled by the permanent-magnet arrangement to supply sensor output signals. The winding's coils are energized by current in a cyclical sequence in dependence upon the sensor output signals, the latter being offset by 120°-el. one from the next. Induced coil voltages are offset by 120°-el.; the coil voltages, in crossing zero, are alternately positive for at most 180°-el. and negative for at most 180°-el. and their sum is equal to zero for all relative positions as between the magnet arrangement and the winding. The position sensors are so arranged relative to the winding's coils that the sensors' changes-of-state substantially coincide with the zero-crossovers of the associated induced coil voltages. The winding's coils are energized via winding driver stages by means of driver voltages which either directly correspond to the sensor output signals or else are derived therefrom.

18 Claims, 5 Drawing Sheets

BRUSHLESS THREE-PHASE D.C. MOTOR

BACKGROUND OF THE INVENTION

The invention concerns a brushless three-phase D.C. motor having a permanent-magnet arrangement and a three-phase winding, these being movable relative to each other, and having three position sensors which are stationary relative to the winding and controlled by the permanent-magnet arrangement to supply sensor output signals each of which is at a first potential for 180°-el. but during the subsequent 180°-el. at a second potential, the winding's coils being energized by current in a cyclical sequence in dependence upon the sensor output signals, which latter are offset by 120°-el. one to the next; in the individual coils of the winding there are induced coil voltages offset by 120°-el., the latter, in passing through zero, being alternately positive during an interval of at most 180°-el. and negative during an interval of at most 180°-el., their sum being equal to zero for all relative positions as between the magnet arrangement and the winding.

D.C. motors of this type in the form of rotary motors are known from Federal Republic of Germany "Offenlegungsschrift" DE-OS 31 22 049 and in the form of linear motors are known from Federal Republic of Germany "Offenlegungsschrift" DE-OS 31 23 441.

In the known motors the permanent-magnet poles are formed by a permanent-magnet ring having an approximately trapezoid-shaped radial-magnetization pattern or are formed by a succession of uniformly spaced, radially magnetized magnet segments, and the poles of the slotted flux-guide element are configured to be in cross section essentially T-shaped. The coils are in non-overlapping fashion each provided around one respective pole of a slotted flux-guide element. The ratio of the coil pitch to the magnet pitch amounts to 2:3. The slot openings between pole shoes of the slotted flux-guide element have a breadth between 3°-el. and 30°-el., whereas the magnet-pole breadth amounts to between at least approximately 120°-el. and, at a maximum, 180°-el. There are induced in the individual coils of the winding stepped voltages which are positive for about 120°-el., almost zero for about 60°-el., and negative for about 120°-el. In the known motors the position sensors have been so arranged relative to the winding's coils that their change-of-state occurs substantially in the middle of the flank which the induced voltage exhibits in undergoing its transition from the 60° zero-voltage interval to the positive interval. For this purpose the position sensors were either arranged at the middle of the slot openings between the pole shoes of the slotted flux-guide element or else at the symmetry axis off the poles of the flux-guide element. Connected between the outputs of the position sensors and an end stage serving to supply current to the winding, there was a decoder operating in such a way that, at any given time, two of the winding's coils were being energized by current at the same time that voltage was being induced in them in correspondence with the 120°-el. intervals.

This known technique leads to a high degree of efficiency combined with simple winding design. However, a disadvantage is the fact that during the commutation interval the torque briefly drops to about 75%, or less, of the peak torque value. Faulty commutations, which are an important consideration in the case of small motors, can in practice lead to the torque's dipping to 50 to 60% of peak value. This is extremely undesirable in many applications.

SUMMARY OF THE INVENTION

Accordingly, it is an object of the invention to further improve a motor of the type described above, in such a way that it provides a torque of considerably improved constancy.

It was surprisingly found that this object can, in accordance with the invention be achieved in a simple way, by so arranging the position sensors relative to the winding's coils that the sensors' changes-of-state substantially coincide with the zero-crossovers of the associated coil voltages, and with the winding's coils being energized via driver stages by means of driver voltages which directly corresponding the sensor output signals or else which are derived therefrom.

With this motor construction the torque fluctuations are in theory equal to zero. In practice, the torque fluctuation can be held down to a value of about ±5 to 7% of the maximum torque, even in the case of small motors where torque fluctuation is critical.

The winding's coils can be Y-connected; in such event, the winding's driver stages can be directly connected to the position sensors. The circuitry cost is especially low, because no decoding is needed between the outputs of the position sensors and the end stage that supplies current to the winding. Furthermore, because the commutation of the winding's coils occurs during an interval in which practically no torque is being produced by the coil that is undergoing commutation, commutation noise is lower, too.

However, the winding's coils can also be delta-connected; in that event, a decoder is connected between the position sensors and the winding's driver stages, the decoder operating in such a way that, during any two successive 180°-el. half-periods of the sensor output signals, the driver voltages are each positive for 120°-el. and negative for 120°-el. and, during the remaining 60°-el. interval between successive 120°-el. intervals, the respective winding-connection terminal is switched off, in other words is potential-free.

The inventive D.C. motor can have a generally cylindrical air gap, and the permanent-magnet arrangement can, in that event, be part of an external rotor. However, the motor can also be designed as a linear motor with an essentially planar air gap. A particularly simple construction is obtained with a four-pole rotor.

In accordance with a preferred further concept of the invention the individual coils of the winding are each provided in non-overlapping fashion around one respective pole of a flux-guide element, the latter forming an air gap together with the permanent-magnet arrangement, each coil axis extending perpendicular to the direction of motion, or perpendicular to the tangent to the direction of motion; the ratio of the coil pitch to the magnet pitch amounts to 2:3, and the individual induced coil voltages are stepped voltages having three steps, being positive for about 120°-el., equal or almost equal to zero for about 60°-el., and negative for about 120°-el., the position sensors being so arranged that their change-of-state occurs substantially in the middle of the 60°-el. zero-voltage interval of the associated induced voltage.

The inventive D.C. motor is fundamentally and above all suited where constant motor torque is the consideration. It finds a preferred application for the drive of signal-processing apparatuses, especially disk drives. In the case of a hard-disk disk drive having a hub which accommodates at least one e.g. magnetic hard disk, the inventive D.C. motor, or at least a substantial portion thereof, is advantageously provided inside the hub. This leads to a particularly compressed construction. This is made possible by the high torque constancy, because the latter allows the motor to be designed for a smaller rated torque than is the case with motors in which large torque fluctuations occur.

Because of its outstanding torque constancy the D.C. motor described herein is furthermore especially suitable as a direct-drive capstan- and/or reel-motor for magnetic-tape apparatuses.

The invention is further described below with reference to preferred exemplary embodiments.

DESCRIPTION OF THE PREFERRED EMBODIMENTS

Figure 1:
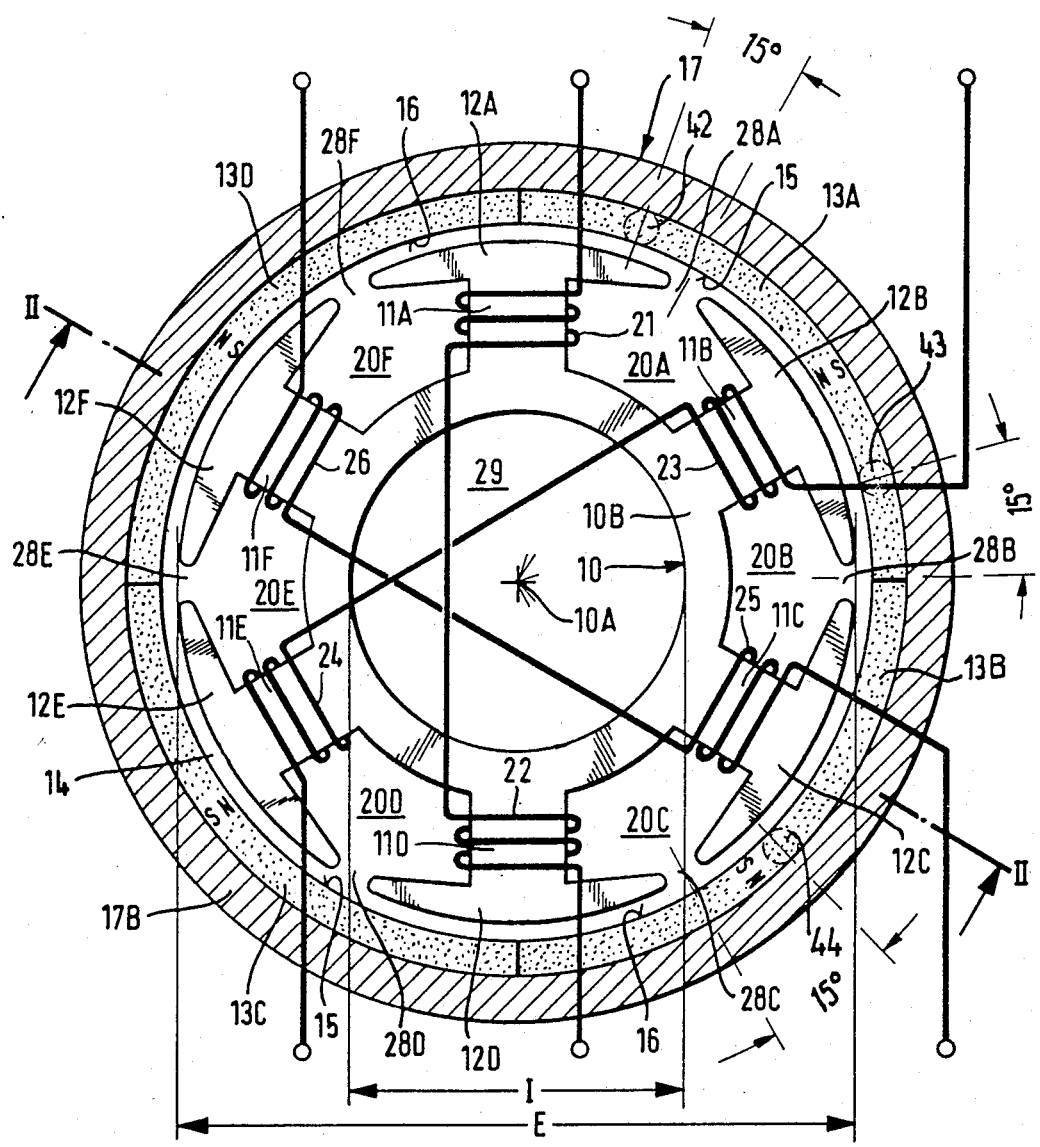
FIG. 1 depicts a section through an inventive D.C. motor along line I—I of FIG. 2.
Figure 2:
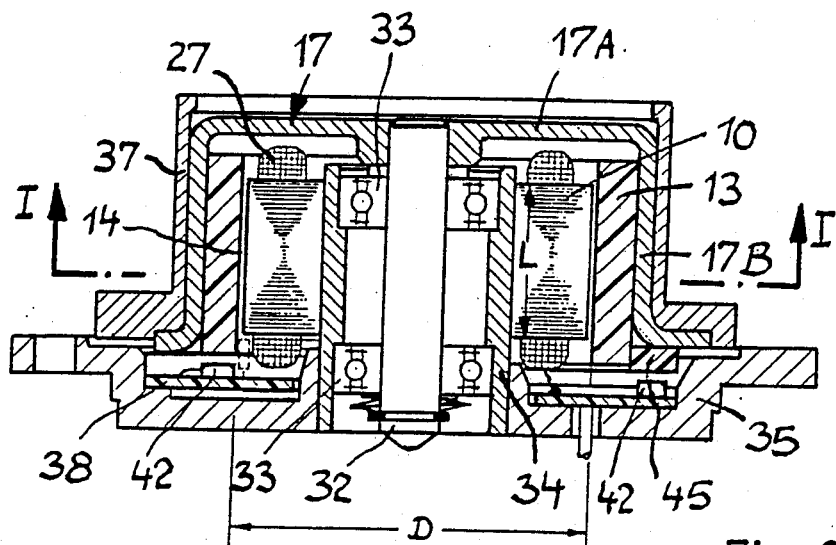
FIG. 2 depicts a schematic section along the line II—II of FIG. 1 when the motor is used as the drive in a magnetic hard-disk disk drive.

In FIGS. 1 and 2 numeral 10 denotes the stator's stack of laminations in a three-phase collectorless D.C. external-rotor motor. The stator's lamination stack 10 is radially symmetric with respect to a center axis 10A and it has a ring-shaped middle section 10B. It forms six stator poles 11A to 11F which are configured to be, in cross section, substantially T-shaped and are arranged at an angular spacing of 60°, one from the next. Instead of a stack of sheet-metal laminations, a sintered iron core can be provided. The pole shoes 12A to 12F of the stator poles define, together with a permanent-magnet ring 13, a generally cylindrical air gap 14. The permanent-magnet ring 13 is, in the manner indicated, radially magnetized to have four poles proceeding circumferentially, i.e. it has four sections 13A to 13D, and at the inner face of the permanent-magnet ring 13, facing the air gap 14, there are to be found, in alternating succession, two magnetic north and two magnetic south poles 15 and 16. In the illustrated embodiment the poles 15, 16 have breadth of substantially 180°-el. (corresponding to 90°-mechanical). In this way one obtains, plotted against the circumferential direction of the air gap 14, a magnetization pattern which is approximately rectangular or trapezoid-shaped. The permanent-magnet ring 13 is provided, for example cemented, in the magnetic-yoke-forming external rotor bell 17. The external rotor bell 17 forms the rotor housing and has an end wall 17A and a cylindrical peripheral wall 17B. For the permanent-magnet ring 13 one can use in particular a rubber-magnet or a synthetic-plastic-bound magnet. Instead of a one-piece permanent-magnet ring 13, plank-like magnet segments can be cemented into the bell 17 or be secured therein in some other way. Especially suitable materials for the magnet ring or the magnet segments are magnetic material in a synthetic binding medium; a mixture of hard ferrite and elastomeric material; ceramic magnetic material; or samarium cobalt. Although in the illustrated embodiment each of the poles 15, 16 extends for 180°-el., narrower poles can also be acceptable. In the interests of high motor power the rotor-pole breadth, however, should amount to at least 120°-el.

The stator poles 11A to 11F delimit altogether six stator slots 20A to 20F. A three-phase stator winding is provided in these slots. Each of the three phases comprises here two 120°-el.-chorded coils 21, 22; 23, 24; and 25, 26, of which each is wound around a respective one of the stator poles 11A to 11F. The two series-connected coils of each phase are located, as shown, diametrically opposite to each other. The coils are preferably wound as two-filament coils in non-illustrated manner. As can be seen in the schematic illustration in FIG. 1, any overlapping among the coils 21 to 26 is avoided. In this way especially short coil ends 27 (FIG. 2) are obtained. The slot openings 28A to 28F can be between 3°-el. and 30°-el. in breadth. With the stator-winding configuration here in question the slots 20A to 20F can be filled to an excellent degree. Closures for the slot openings 28A to 28F are generally not needed.

The present motor construction assures the achievement of a relatively large internal aperture 29 for the stator, because the depth of the stator slots 20A to 20F can be kept comparatively small. Without any further special measures being adopted, one can achieve a ratio of at least 0.35 as between the diameter I of the internal aperture 29 and the stator's outer diameter E taken in the region of the pole shoe 12. Preferably, the value of I/E is in the range from 0.4 to 0.7. The ratio L/D as between the axial length L of the stator iron and the maximum diameter D of the air gap 14 is preferably equal to or less than unity. These dimensional relationships achieve particular significance in regard to a stable bearing system for the rotor. Such a bearing system is, for example, of enormous importance in the case of drives for disk-drive systems. Additionally, the total resistance of the stator winding is kept especially low.

In accordance with FIG. 2, to provide a bearing system for the rotor, a stub shaft 32 is secured in the middle of the external rotor bell 17 and is supported by axially spaced ball bearings 33 in a cylindrical sleeve 34, the latter carrying the stator's stack of laminations and being secured on a mounting flange 35.

The hub 37, made for example of light metal, of a hard-disk drive is pushed into place on the external rotor bell 17. The hub 37 serves to accommodate one or several data-storing hard disks. It is located, in known fashion, within a highly clean chamber of the disk drive. The mounting flange 35 carries a printed-circuit board 38 on which can be provided the commutation electronics and perhaps further circuit components, for example for speed regulation. In particular, three position sensors 42, 43, 44 are mounted on the printed-circuit board 38 and can be, in the illustrated embodiment, magnetic-field sensors such as for example Hall generators, field plates, magnetic diodes, or the like. Hall IC's which change state in bistable fashion are especially advantageous. The use of rotor poles 15, 16 having a breadth of 180°-el. allows one to use as the control magnet for the position sensors 42, 43, 44 the main magnet itself, i.e. the permanent-magnet ring 13, as indicated in the left half of FIG. 2. However, if desired, a separate control magnet 45 can instead be provided for the position sensors. This is indicated in the right half of FIG. 2. In the FIG.

2 embodiment the position sensors 42, 43, 44 face axially towards the controlling magnet 13 or 45. However, it is for example also possible, as indicated by broken lines in FIG. 2, to so arrange the position sensors that they face in radial direction towards the controlling magnet, here the permanent-magnet ring 13. In any event, it is important to so position the position sensors 42, 43, 44 circumferentially relative to the coils 21 to 26 that the sensors' changes-of-state substantially coincide with the zero-crossover of the associated coil voltage. In the embodiment shown in FIG. 1 this is achieved by having the position sensors be offset by 15°-mech. relative to the middles of the slot openings 28A, 28B and 28C.

Figure 3:
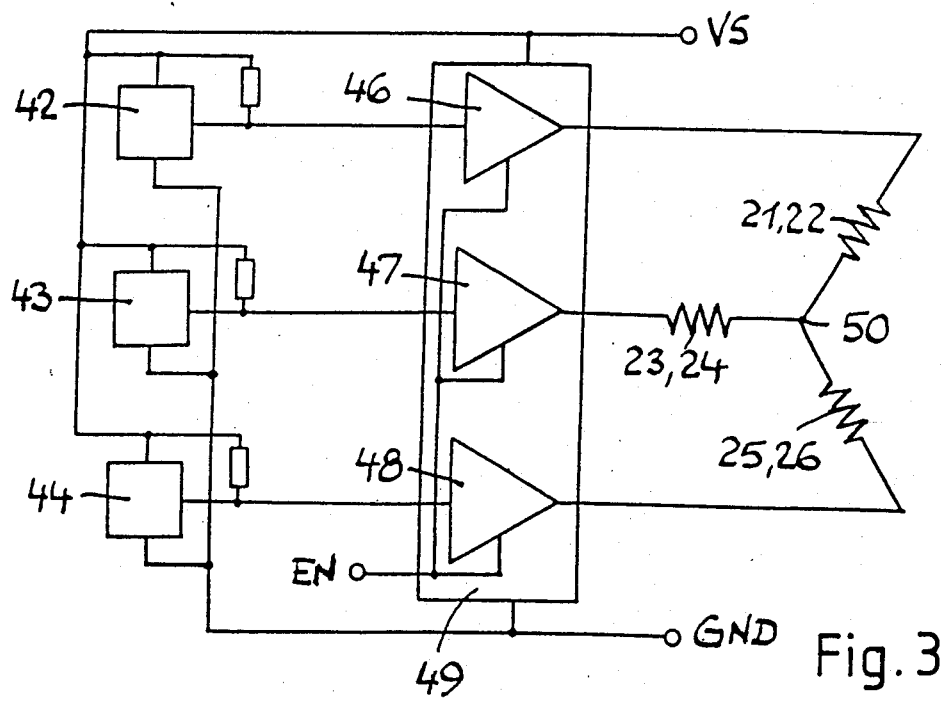
FIG. 3 depicts schematically a circuit diagram of a drive with a motor in accordance with FIGS. 1 and 2, the coils of the motor's winding being Y-connected.

In accordance with FIG. 3 the outputs of the position sensors 42, 43, 44 are connected directly to the inputs of respective driver amplifiers 46, 47, 48 of an end stage 49. The outputs of the driver amplifiers 46, 47, 48 are in turn connected to those terminals of the respective coil-pairs 21, 22; 23, 24; and 25, 26 not connected to the neutral terminal of the Y. The supply voltage is applied to the terminals VS and GND. An enabling signal is applied to the end stage 49 via a terminal EN.

Figure 4:
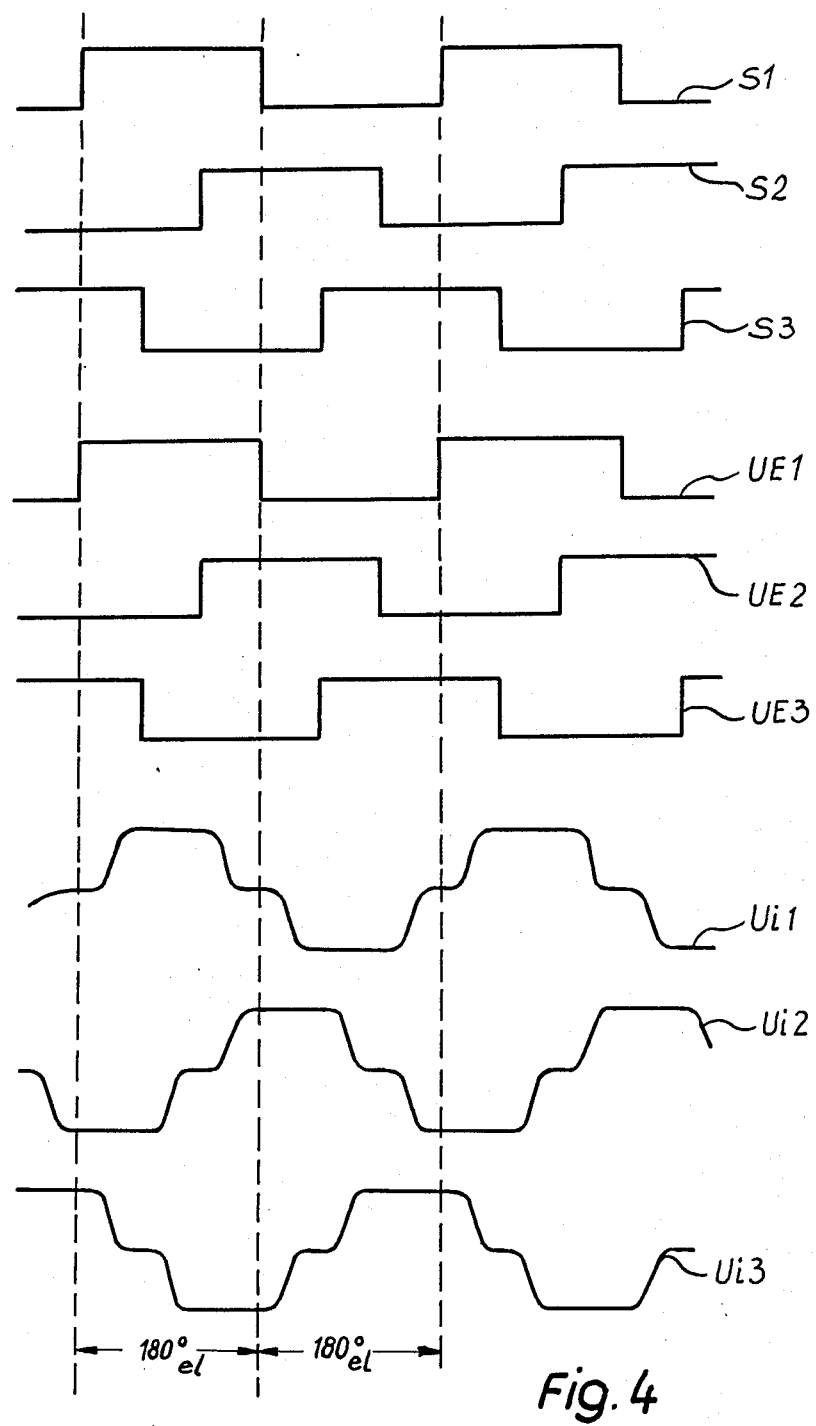
FIG. 4 depicts a series of signals or voltages such as occur with a motor in accordance with FIGS. 1 to 3.

The position sensors 42, 43, 44 supply three sensor output signals, denoted in FIG. 4 by S1, S2 and S3 which are offset one from the next by 120°-el. These signals are merely amplified by the driver amplifiers 46, 47, 48 of end stage 49. The correspondingly amplified end-stage voltages are denoted by UE1, UE2 and UE3 in FIG. 4. A stepped voltage having three steps is induced in each of the coil-pairs 21, 22; 23, 24; 25, 26 by the permanent-magnet ring 13. These voltages, which are measured relative to the Y's neutral terminal 50, are illustrated in FIG. 4 at Ui1, Ui2 and Ui3. As shown, each of the induced voltages Ui1, Ui2, Ui3 is positive for about 120°-el. and negative for about 120°-el. In between is an interval lasting about 60°-el. during which the induced voltage has a substantially decreased value and in the middle of this interval the induced voltage crosses zero. This 60°-el.-long interval will be referred to herein as the zero-voltage interval.

As can be seen in FIG. 4, the changes-of-state of the position sensors 42, 43, 44, i.e. the jumps in the signals S1, S2, S3, coincide with the zero-crossovers of the associated induced coil voltages Ui1, Ui2, Ui3, respectively. It furthermore follows from FIG. 4 that the induced coil voltages Ui1, Ui2, Ui3 satisfy the condition that their sum be equal to zero for every relative position as between the permanent-magnet ring 13 and the winding formed by coils 21 to 26. However, the invention is not limited to the illustrated shape of the induced stepped voltages. For example, the induced voltages could also have a sinusoidal shape.

Figure 5:
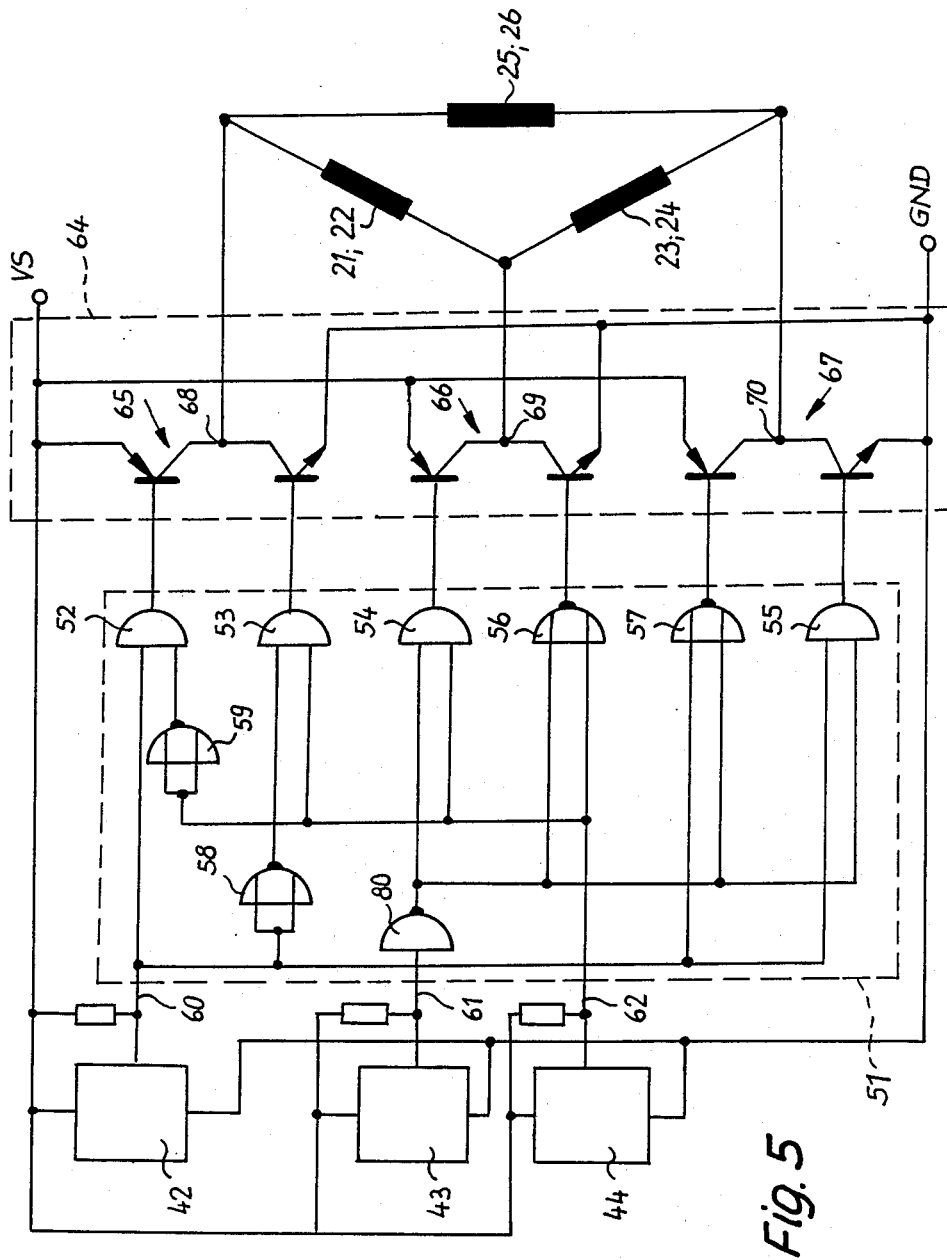
FIG. 5 depicts schematically a circuit diagram of a drive with a motor in accordance with FIGS. 1 and 2, the winding's coils being delta-connected.
Figure 6:
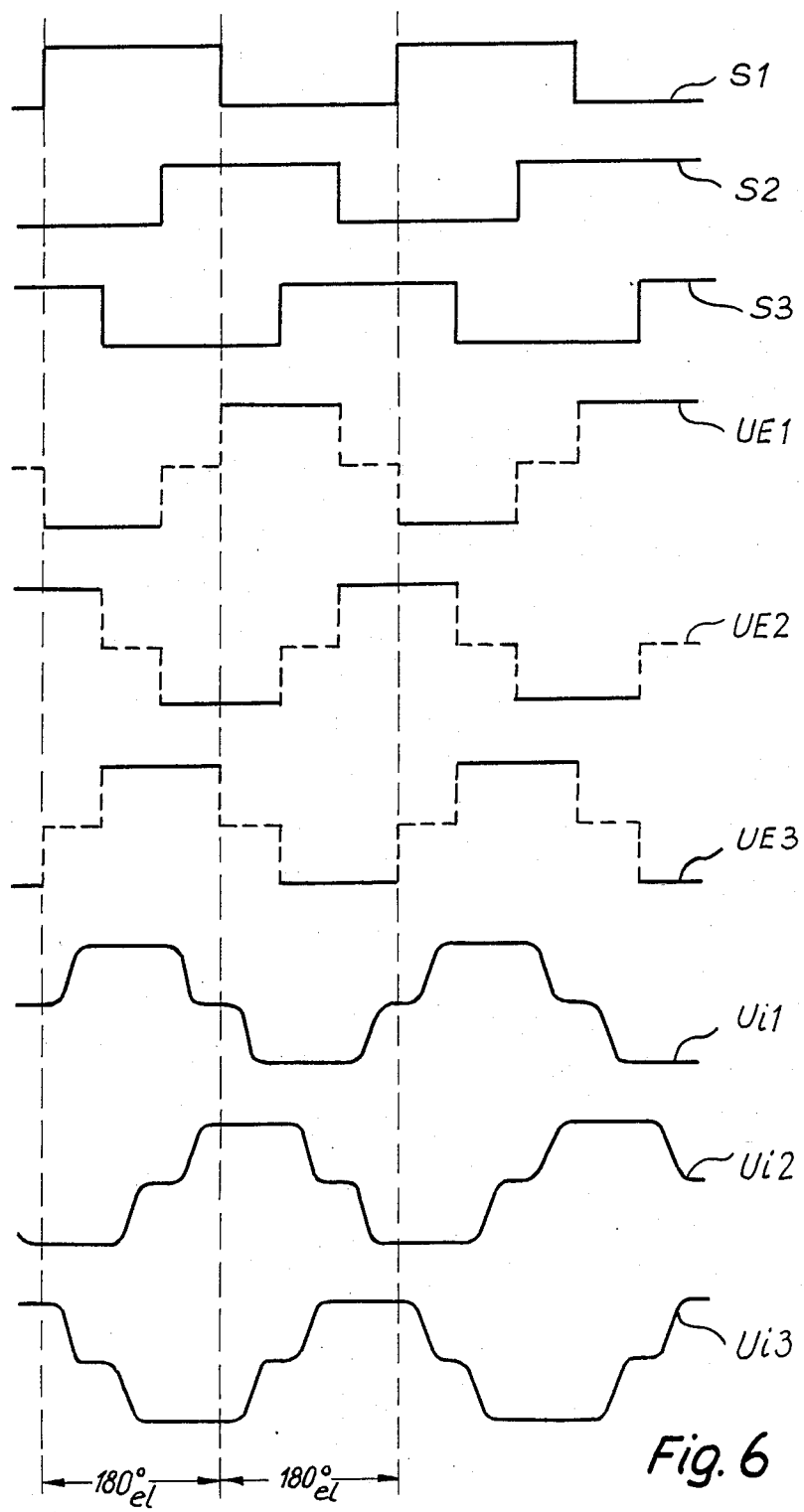
FIG. 6 depicts a signal chart similar to FIG. 4 for the motor according to FIGS. 1, 2 and 5.

In the modified emobodiment of FIGS. 5 and 6 the winding's coils 21, 22; 23, 24; and 25, 26 are delta-connected. Between the outputs of the position sensors 42, 43, 44 and the inputs of the end stage 49 there is provided a decoder 51 constructed in the known way from AND-gates 52, 53, 54 and 55, NAND-gates 56, 57 and inverters 58, 80, 59. Decoder 51 derives from the sensor output signals applied to its three inputs 60, 61, 62 six input signals for the end stage 64. End stage 64 has three driver stages 65, 66, 67, each one configured as a half-bridge circuit having semiconductor stages, e.g. end-stage transistors or thyristors, whose output current paths are connected to each other in series. The delta-connected coils 21, 22; 23, 24; and 25, 26 of the winding are connected to winding-connection terminals 68, 69, 70 of the end stage 64. The decoder 51 is so designed that, at the winding-connection terminals 68, 69, 70, there appear end-stage voltages UE1, UE2 and UE3—with respect to GND—having the shape shown in FIG. 6. As can be seen in FIG. 6, the end-stage or driver voltages UE1, UE2 and UE3 are likewise offset by 120°-el. one to the next. During any two successive 180°-el. half-periods of the sensor output signals S1, S2, S3, these voltages are in each instance positive for 120°-el. and negative for 120°-el. The 120°-el. intervals of each of the voltages UE1, UE2, UE3 are separated from each other by a respective 60°-el. interval, during which the respective winding-connection terminal 68, 69 or 70 is switched off. In the coil-pairs 21, 22; 23, 24; and 25, 26 there are again induced three-step stepped voltages having the shape shown in FIG. 6 at Ui1, Ui2 and Ui3, respectively. Thus, the criteria are analogous to the embodiment described earlier.

It is to be emphasized that in FIGS. 4 and 6 the relative times of occurrence of the various signals are depicted in true scale.

In accordance with FIG. 2 the motor is provided in a space-saving fashion inside the disk drive's hub 37. Because of the high constancy of the torque produced by the motor, only the peak torque need suffice to overcome the high frictional forces encountered during start-up of the disk drive. In contrast, with motors having marked torque dips, it was necessary that this requirement be already met by the minimum torque the motor exerts, which e.g. is only 60% of the peak torque. Consequently, the peak torque had to be selected correspondingly higher. The minimal torque fluctuations achieved herein allow especially advantageous dimensioning of the motor both for start-up and for rated speed.

The above described principle can be advantageously utilized not only in the case of rotary drives, but also in the case of linear drives. In such event the linear motor can for example be in all other respects constructed in the manner known from Federal Republic of Germany "Offenlegungsschrift" DE-OS 31 23 441.

I claim:

1. Collectorless three-phase D.C. motor having a permanent-magnet arrangement and a three-phase winding, these being movable relative to each other, and having three position sensors which are stationary relative to the winding and controlled by the permanent-magnet arrangement, the winding comprise coils which are Y-connected and energized by current in a cyclical sequence in dependence upon the sensors' output signals, which latter are offset by 120°-el. one to the next, there being induced in the individual coils of the winding coil voltages, measured relative to the Y's neutral terminal, which are offset by 120°-el.; the coil voltages, in passing through zero, being alternately positive for an interval of at most 180°-el. and negative for an interval of at most 180°-el. and their sum being equal to zero for every relative position as between the magnet arrangement and the winding, the improvement wherein the position sensors are so arranged relative to the winding's coils that the sensors' changes-of-state substantially coincide with the zero-crossovers of the associated coil voltages, and the winding's coils are energized via winding driver stages by means of driver voltages that directly correspond to the sensor output signals.

2. D.C. motor according to claim 1, wherein the motor has a generally cylindrical air gap and the permanent-magnet arrangement is part of an external rotor.

3. D.C. motor according to claim 1, wherein the motor is designed as a linear motor having an essentially planar air gap.

4. D.C. motor according to claim 2, wherein the rotor is designed to have four poles.

5. D.C. motor according to claim 1, wherein the individual coils of the winding are each provided in non-overlapping fashion around one respective pole of a slotted flux-guide element, the latter together with the permanent-magnet arrangement defining an air gap, the coils having coil axes which are perpendicular to the tangent to the direction of motion, the ratio of the coil pitch to the magnet pitch amounting to 2:3, the individual induced coil voltages being three-step stepped voltages that are positive for about 120°-el., equal or almost equal to zero for about 60°-el., and negative for about 120°-el., and the position sensors are so arranged that their change-of-state occurs substantially in the middle of the 60°-el. zero-voltage interval of the associated induced voltage.

6. Use of the D.C. motor of claim 2 for the drive of signal-processing apparatuses, especially disk drives.

7. Use according to claim 6 in hard-disk disk drive having a hub which accommodates at least one hard disk, the D.C. motor, or at least a substantial portion thereof, being provided inside the hub.

8. Use of the D.C. motor of claim 2 in a magnetic-tape apparatus as its direct-drive capstan- and/or reel-motor.

9. Collectorless three-phase D.C. motor having a permanent-magnet arrangement and a three-phase winding, these being movable relative to each other, and having three position sensors which are stationary relative to the winding and controlled by the permanent-magnet arrangement to supply sensor output signals each of which is at a first potential during 180°-el. and at a second potential during the next-following 180°-el., the winding comprising delta-connected coils energized by current in a cyclical sequence in dependence upon the sensor output signals, which latter are offset by 120°-el. one to the next, there being induced in the individual coils of the winding coil voltages which are offset by 120°-el. and which, in crossing through zero, are alternately positive for an interval of at most 180°-el. and negative for an interval of at most 180°-el. with their sum being equal to zero for all relative positions as between the magnet arrangement and the winding, characterized in that, the position sensors are so arranged relative to the winding's coils that the sensors' changes-of-state substantially coincide with the zero-crossovers of the associated coil voltages, and the winding's coils are energized via winding driver stages by means of driver voltages derived from the sensor output signals.

10. D.C. motor according to claim 1, characterized in that the individual coils of the winding are, in non-overlapping fashion, each provided around one respective pole of a slotted flux-guide element, the latter together with the permanent-magnet arrangement defining an air gap, the coils having coil-axes extending perpendicular to the tangent to the direction of motion, the ratio of the coil pitch to the magnet pitch amounting to 2:3, the individual induced coil voltages being three-step stepped voltages each of which is positive for about 120°-el., equal or almost equal to zero for about 60°-el., and negative for about 120°-el., and the position sensors are so arranged that their change-of-state occurs substantially in the middle of the 60°-el. zero-voltage interval of the associated induced voltage.

11. D.C. motor according to claim 9, wherein there is connected between the position sensors and the winding's driver stages a decoder operating in such a way that, during any two successive 180°-el. half-periods of the sensor output signals, the driver voltages are each positive for 120°-el. and negative for 120°-el. and, during the two 60°-el. intervals between successive 120°-el. intervals, the respective winding-connection terminal is switched off.

12. D.C. motor according to claim 9, wherein the motor has a generally cylindrical air gap and the permanent-magnet arrangement is part of an external rotor.

13. D.C. motor according to claim 9, wherein the motor is designed as a linear motor having an essentially planar air gap.

14. D.C. motor according to claim 12, wherein the rotor is designed to have four poles.

15. D.C. motor according to claim 9, wherein the individual coils of the winding are, in non-overlapping fashion, each provided around one respective pole of a slotted flux-guide element, the latter together with the permanent-magnet arrangement defining an air gap, the coils having coil-axes extending perpendicular to the tangent to the direction of motion, the ratio of the coil pitch to the magnet pitch amounting to 2:3, the individual induced coil voltages being three-step stepped voltages each of which is positive for about 120°-el., equal or almost equal to zero for about 60°-el., and negative for about 120°-el., and the position sensors are so arranged that their change-of-state occurs substantially in the middle of the 60°-el. zero-voltage interval of the associated induced voltage.

16. Use of the D.C. motor of claim 12 for the drive of signal-processing apparatuses, especially disk drives.

17. Use in accordance with claim 16 for a hard-disk disk drive having a hub which accommodates at least one hard disk, the D.C. motor, or at least a substantial portion thereof, being provided inside the hub.

18. Use of the D.C. motor of claim 12 in a magnetic-tape apparatus as the direct-drive capstan- and/or reel-motor.

* * * * *